(12) United States Patent
Shin (10) Patent No.: US 11,257,368 B2
(45) Date of Patent: Feb. 22, 2022

(54) SERVER FOR PROVIDING A VEHICLE CONTENT SHARING SERVICE AND A CONTENT SHARING METHOD

(71) Applicants: HYUNDAI MOTOR COMPANY, Seoul (KR); KIA MOTORS CORPORATION, Seoul (KR)

(72) Inventor: Yong Jin Shin, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 76 days.

(21) Appl. No.: 16/942,408

(22) Filed: Jul. 29, 2020

(65) Prior Publication Data

US 2021/0192949 A1 Jun. 24, 2021

(30) Foreign Application Priority Data

Dec. 20, 2019 (KR) .......................... 10-2019-0172520

(51) Int. Cl.
*G08G 1/0967* (2006.01)
*H04W 4/46* (2018.01)

(52) U.S. Cl.
CPC ............... *G08G 1/096791* (2013.01); *G08G 1/096758* (2013.01); *H04W 4/46* (2018.02)

(58) Field of Classification Search
CPC ...... G08G 1/096791; G08G 1/096758; H04W 4/46
See application file for complete search history.

(56) References Cited

U.S. PATENT DOCUMENTS

| | | | |
|---|---|---|---|
| 11,180,159 B1* | 11/2021 | Post | B60W 50/14 |
| 2010/0094532 A1* | 4/2010 | Vorona | G08G 1/096775 701/119 |
| 2012/0151073 A1* | 6/2012 | Bai | G06F 16/9574 709/228 |
| 2013/0073193 A1* | 3/2013 | Heavey | G08G 1/096791 701/119 |
| 2014/0195110 A1* | 7/2014 | Kim | G01C 21/3697 701/36 |

(Continued)

FOREIGN PATENT DOCUMENTS

JP 5614176 B2 10/2014
KR 20190082500 A 7/2019

*Primary Examiner* — Chico A Foxx
(74) *Attorney, Agent, or Firm* — Lempia Summerfield Katz LLC (57) ABSTRACT

A content sharing server provides a vehicle content sharing service and a method thereof. The content sharing server for providing a vehicle content sharing service includes a communication device that receives content sharing information including vehicle identification information, content information reproducible in a vehicle, and driving information from at least one content receiving vehicle. The content sharing server further includes a content sharing controller that stores the content sharing information, searches for a plurality of content providing vehicles that store content to be reproduced in the at least one content receiving vehicle, divides the content based on the plurality of content providing vehicles, and downloads, to the at least one content receiving vehicle, the divided content uploaded from the plurality of content providing vehicles in order of preset priority.

20 Claims, 6 Drawing Sheets

(56) References Cited

U.S. PATENT DOCUMENTS

| | | | |
|---|---|---|---|
| 2015/0127686 A1* | 5/2015 | Kim | G06F 16/16 707/803 |
| 2016/0192172 A1* | 6/2016 | Kim | H04L 67/12 370/329 |
| 2016/0379486 A1* | 12/2016 | Taylor | G01C 21/3691 340/905 |
| 2018/0270282 A1* | 9/2018 | Johnsen | H04L 65/4084 |
| 2018/0309760 A1* | 10/2018 | Arasavelli | H04L 63/105 |
| 2019/0120964 A1* | 4/2019 | Luo | G01S 17/86 |
| 2020/0084193 A1* | 3/2020 | Beaurepaire | H04L 63/105 |
| 2020/0207371 A1* | 7/2020 | Dougherty | B60W 50/0097 |
| 2020/0287960 A1* | 9/2020 | Higuchi | H04W 4/40 |
| 2020/0288374 A1* | 9/2020 | Henry | H04W 40/32 |
| 2020/0334980 A1* | 10/2020 | Ludwig | H04L 67/12 |
| 2020/0342760 A1* | 10/2020 | Vassilovski | H04W 4/46 |
| 2020/0393847 A1* | 12/2020 | Govindan | G01C 21/3664 |
| 2020/0396787 A1* | 12/2020 | Brugman | H04W 76/19 |
| 2020/0410851 A1* | 12/2020 | Saito | G08G 1/091 |
| 2021/0056770 A1* | 2/2021 | Moradi Pari | H04W 4/38 |
| 2021/0304618 A1* | 9/2021 | Okuyama | B60W 30/0956 |

* cited by examiner

SERVER FOR PROVIDING A VEHICLE CONTENT SHARING SERVICE AND A CONTENT SHARING METHOD

CROSS-REFERENCE TO RELATED APPLICATION

This application claims the benefit of priority to Korean Patent Application No. 10-2019-0172520, filed in the Korean Intellectual Property Office on Dec. 20, 2019, the entire contents of which are incorporated herein by reference.

TECHNICAL FIELD

The present disclosure relates to a vehicle and a system capable of controlling the vehicle, and more particularly, to a server for providing a vehicle content sharing service and a content sharing method.

BACKGROUND

An infotainment system installed in a vehicle may provide various entertainment services such as a music streaming service, a television service, as well as basic driving functions and the like. Current infotainment systems may exchange various information with a mobile terminal or may provide various data or information to a passenger in acoustic form, visual form, or a combination form thereof.

Despite the development of infotainment systems, files that can be downloaded to a vehicle are limited to a system software (SW) or a map.

Figure 1:
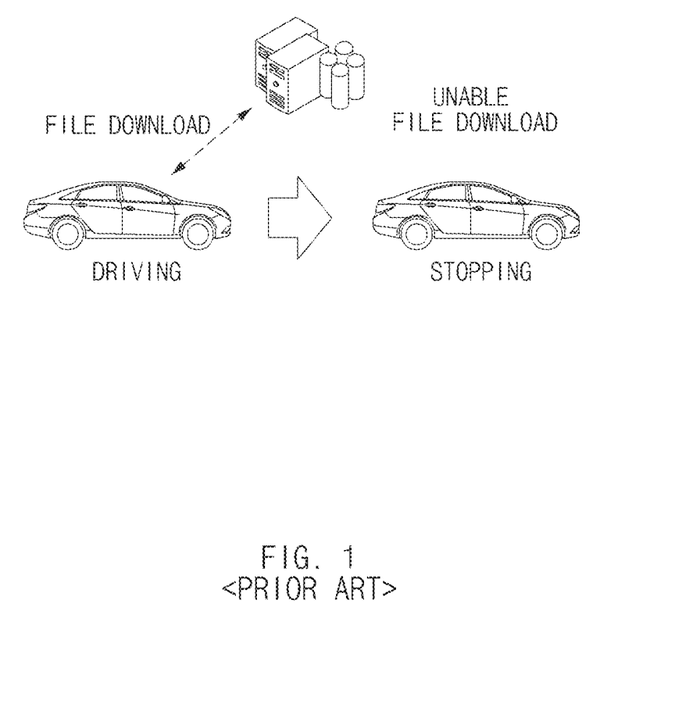
FIG. 1 is a block diagram illustrating a file download of a vehicle according to the related art.

FIG. 1 is a view illustrating a file download of a vehicle according to the related art.

As shown, while a vehicle is driven, in a situation in which an Audio, Video, Navigation, and Telematics (AVNT) integrated multimedia system is powered on, it is possible to download files regardless of a size of the files. However, when the driving is finished, in a situation in which the AVNT system is powered off, downloading of any file is stopped.

In addition, in the 5G era, although the amount of data used in a vehicle is expected to change as the data usage increases, free content download is currently impossible due to data usage restrictions. In other words, there is currently no system or method for substantially sharing data between vehicles.

In the future, as autonomous driving is introduced, drivers may spend more time resting in autonomous vehicles than driving. As a result, a bigger volume of data is expected to be consumed via infotainment systems. Therefore, there is a need to provide ways of easily obtaining and sharing desired content through data sharing between vehicles with unlimited data usage.

SUMMARY

The present disclosure has been made to solve the above-mentioned problems occurring in the prior art while advantages achieved by the prior art are maintained intact.

An aspect of the present disclosure provides a server for providing a vehicle content sharing service and a content sharing method that can easily obtain desired content data, i.e., content, through data sharing between vehicles.

Another aspect of the present disclosure provides a server for providing a vehicle content sharing service and a content sharing method that can download content in advance by learning a driving pattern of a driver and use the content without inconvenience.

Still another aspect of the present disclosure provides a server for providing a vehicle content sharing service and a content sharing method that can download content in a state in which a vehicle is turned off.

The technical problems to be solved by the present inventive concept are not limited to the aforementioned problems. Any other technical problems not mentioned herein should be clearly understood from the following description by those of ordinary skill in the art to which the present disclosure pertains.

According to an aspect of the present disclosure, a content sharing server for providing a vehicle content sharing service includes a communication device that receives content sharing information including vehicle identification information, content information reproducible in a vehicle, and driving information from at least one content receiving vehicle. The content sharing server further includes a content sharing controller that: stores the content sharing information; searches for a plurality of content providing vehicles that store content to be reproduced in the at least one content receiving vehicle; divides the content based on a number of the plurality of content providing vehicles; and downloads, to the at least one content receiving vehicle, the divided content uploaded from the plurality of content providing vehicles in order of a preset priority.

The content sharing controller may calculate a time required for the at least one content receiving vehicle to move to a destination based on the driving information, determine a content size corresponding to the time, and divide the content corresponding to the content size based on the number of the plurality of content providing vehicles.

The content sharing controller may understand communication states of the plurality of content providing vehicles. The content sharing controller may be further request a content providing vehicle having a highest signal strength among the plurality of content providing vehicles to upload the divided content in a first rank. The divided content uploaded in the first rank may be reproduced first.

The content sharing controller may understand communication states of the plurality of content providing vehicles. The content sharing controller may request a content providing vehicle having a highest signal strength among the plurality of content providing vehicles to upload a largest amount of divided content.

The content sharing information may further include driving information including a departure point and a destination, signal strength for data communication, a content reproduction time, and content format information.

The content sharing information may be transmitted when a vehicle is turned off.

The content sharing controller may learn a vehicle driving pattern based on the driving information, understand a destination of the vehicle and a driving time to the destination based on the learned driving pattern when the vehicle is turned on, and search for a content providing vehicle that stores a same content as the content reproduced in the content receiving vehicle.

The content sharing controller may receive a remaining portion of the content that has not been reproduced in the content receiving vehicle from the content providing vehicle.

The content sharing controller may receive the same content from a content providing vehicle which is turned on among the content providing vehicles storing the same content.

The content sharing controller may download the content after switching to a wakeup state when the at least one content receiving vehicle is turned off, and may switch the at least one content receiving vehicle to a sleep state after downloading the content.

The content stored in the at least one content receiving vehicle may be uploaded to another vehicle when the content receiving vehicle is in a wakeup state.

The at least one content receiving vehicle may search for information about content stored in the content providing vehicle through the content sharing server.

According to another aspect of the present disclosure, a content sharing method for providing a vehicle content sharing service includes: receiving content sharing information including vehicle identification information, content information reproducible in a vehicle, and driving information from at least one content receiving vehicle; storing and learning the received content sharing information; searching for a plurality of content providing vehicles that stores a content to be reproduced in the at least one content receiving vehicle; dividing the content based on a number of the plurality of content providing vehicles and uploading the divided content from the plurality of content providing vehicles in order of a preset priority; and downloading the divided content to the at least content receiving vehicle.

BRIEF DESCRIPTION OF THE DRAWINGS

The above and other objects, features and advantages of the present disclosure should be more apparent from the following detailed description taken in conjunction with the accompanying drawings.

DETAILED DESCRIPTION

Hereinafter, some embodiments of the present disclosure are described in detail with reference to the drawings. In adding the reference numerals to the components of each drawing, it should be noted that identical or equivalent components are designated by identical numerals even when they are displayed on other drawings. Further, in describing the embodiments of the present disclosure, a detailed description of well-known features or functions has been omitted in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those of ordinary skill in the art to which the present disclosure pertains. Such terms as those defined in a generally used dictionary are to be interpreted as having meanings equal to the contextual meanings in the relevant field of art. Such terms are not to be interpreted as having ideal or excessively formal meanings unless clearly defined as having such in the present application.

Hereinafter, embodiments of the present disclosure are described in detail with reference to FIGS. 2-6. When a component, device, element, or the like of the present disclosure is described as having a purpose or performing an operation, function, or the like, the component, device, or element should be considered herein as being "configured to" meet that purpose or to perform that operation or function. Further, the server and controller described herein, and the corresponding processor or processors, may be programmed to perform the noted purpose, operation, function, operation, or the like.

Figure 2:
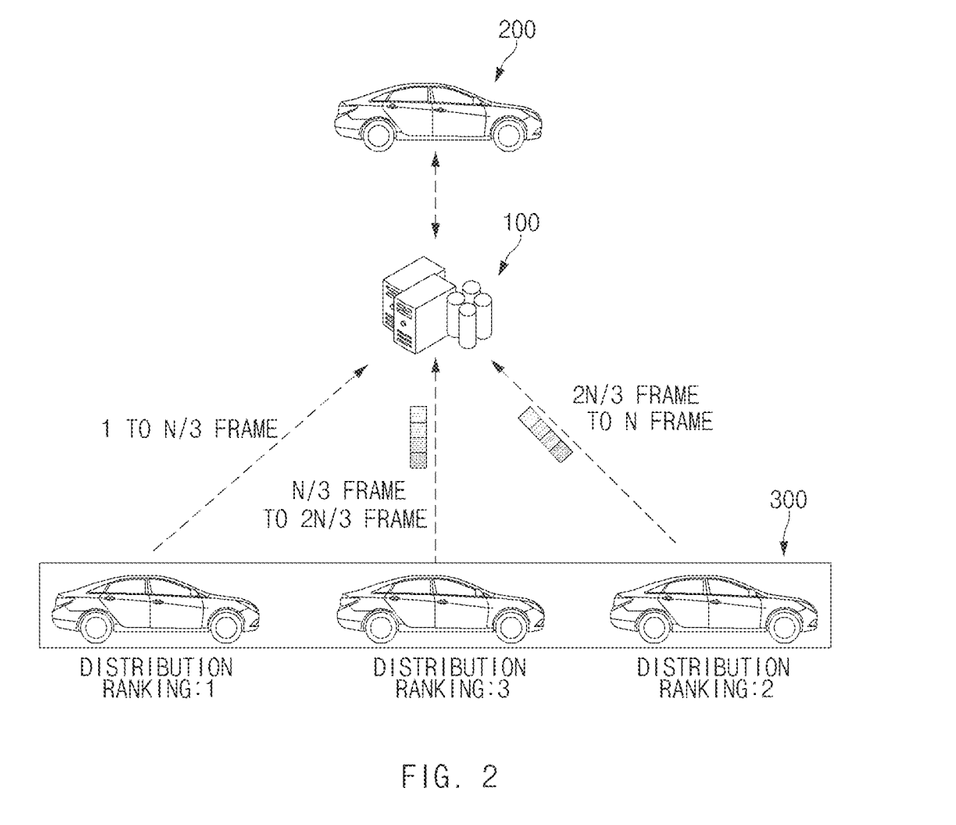
FIG. 2 is a view illustrating a server for providing a vehicle content sharing service according to an embodiment of the present disclosure.

FIG. 2 is a block diagram illustrating a configuration of a server for providing a vehicle content sharing service according to an embodiment of the present disclosure.

Referring to FIG. 2, a system according to an embodiment of the present disclosure may include: a plurality of vehicles 200 and 300 that are driven or that have stopped; and a content sharing server 100 for controlling content, i.e., content data, sharing between the vehicles 200 and 300. For convenience of description, a vehicle requesting content sharing or a vehicle to which content data is downloaded is referred to as the content receiving vehicle 200. A vehicle providing content to another vehicle is referred to as the content providing vehicle 300. The content receiving vehicle 200 may be the content providing vehicle 300 that provides content. The content providing vehicle 300 may also be the content receiving vehicle 200 that receives content.

The content receiving vehicle 200 and the content providing vehicle 300 according to an embodiment transmit, to the content sharing server 100, content sharing information, i.e., content sharing information data, that includes vehicle identification information, content information to be reproduced in a vehicle, and a driving time.

In other words, the content sharing information may include vehicle identification information including information about the vehicle type, driving information such as departure information or destination information, driving time information from a departure to a destination, and content information which can be reproduced or stored in the vehicle. In addition, the content sharing information may include content reproduction time and content format information (e.g., information related to a music file, such as a title of an album, an album name, and an artist, in a metadata format used in an ID3 tag MP3 file). The content sharing information may include information about data communication signal strength for data sharing between vehicles.

As described above, the vehicles 200 and 300 may be equipped with an infotainment system. The vehicles 200 and 300 may specifically reproduce content such as various video or audio through an integrated multi-media system (Audio, Video, Navigation, Telematics, or AVNT). In this case, telematics means that wireless communication and global positioning system (GPS) technology are combined to receive various mobile communication services such as location information, safe driving, entertainment, financial service, reservations, and product purchases in a vehicle. The integrated multimedia system may be integrally formed with internal controllers of a vehicle or may be implemented as a separate device which is connected to the internal controllers of the vehicle by a separate connection unit.

The content sharing server 100 may receive and store content sharing information from the vehicles 200 and 300, search for the plurality of content providing vehicles 300 that store the content to be reproduced during the driving time of the content receiving vehicle 200, divide the searched content based on the number of content providing vehicles 300, and download the divided content uploaded from the content providing vehicles 300 to the content receiving vehicle 200 in order of a preset priority.

Although not shown, the content sharing server 100 may include a communication device that receives content sharing information including vehicle identification information, content information reproducible in a vehicle, and driving information from at least one content receiving vehicle. The content sharing server 100 may further include a content sharing controller that downloads the content to a content receiving vehicle. The overall control of content sharing including downloading and uploading of content may be performed by the content sharing controller. The operation of the content sharing server 100 described in the present disclosure may be interpreted as being performed by the content sharing controller.

The content sharing server 100 according to an embodiment searches for at least one content providing vehicle 300 of a plurality of content providing vehicles capable of providing content. The content sharing server 100 receives the content to be divided, which is individually uploaded from the plurality of content providing vehicles 300, and provides the content to the content receiving vehicle 200.

The content sharing server 100 does not simply control content sharing between vehicles. Instead, the content sharing server 100 divides content to be provided based on a specified criterion, and uploads and downloads the divided content in a specified order or at a specified time in order of preset priority.

In addition, the content sharing controller of the content sharing server 100, may calculate a time required for the content receiving vehicle 200 to move to a destination based on the driving information. The content sharing controller may determine a content size corresponding to the time. The content corresponding to the determined content size may be divided based on the number of the plurality of content providing vehicles 300.

For example, when the time required for the content receiving vehicle 200 to reach the destination is calculated as 20 minutes, the content sharing controller may search for content to be reproduced for 20 minutes. The size of the searched content may be divided based on the number of the plurality of content providing vehicles 300.

In addition, the content sharing controller may receive content from the content providing vehicle 300 except for a piece of content that has already been reproduced, i.e., a portion of the content that has not be reproduced, in the content receiving vehicle 200.

For example, when 5 minutes of content having a playback time of 15 minutes is reproduced, the content sharing controller may divide the content for the remaining 10 minutes corresponding to the number of the plurality of content providing vehicles 300. Therefore, only content of 10 minutes may be uploaded from the content providing vehicles 300.

As shown in FIG. 2, as an example, three content providing vehicles 300 capable of providing content have been found. The content sharing server 100 receives the content to be divided by three from the plurality of content providing vehicles 300 and according to the number of content providing vehicles.

The entire content of 1 to N frames may be divided into three frames (1 to N/3 frames, N/3 frames to 2N/3 frames, and 2N/3 frames to N frames). The divided content may be uploaded and/or downloaded simultaneously or sequentially in a specific order (distribution ranking).

Figure 3:
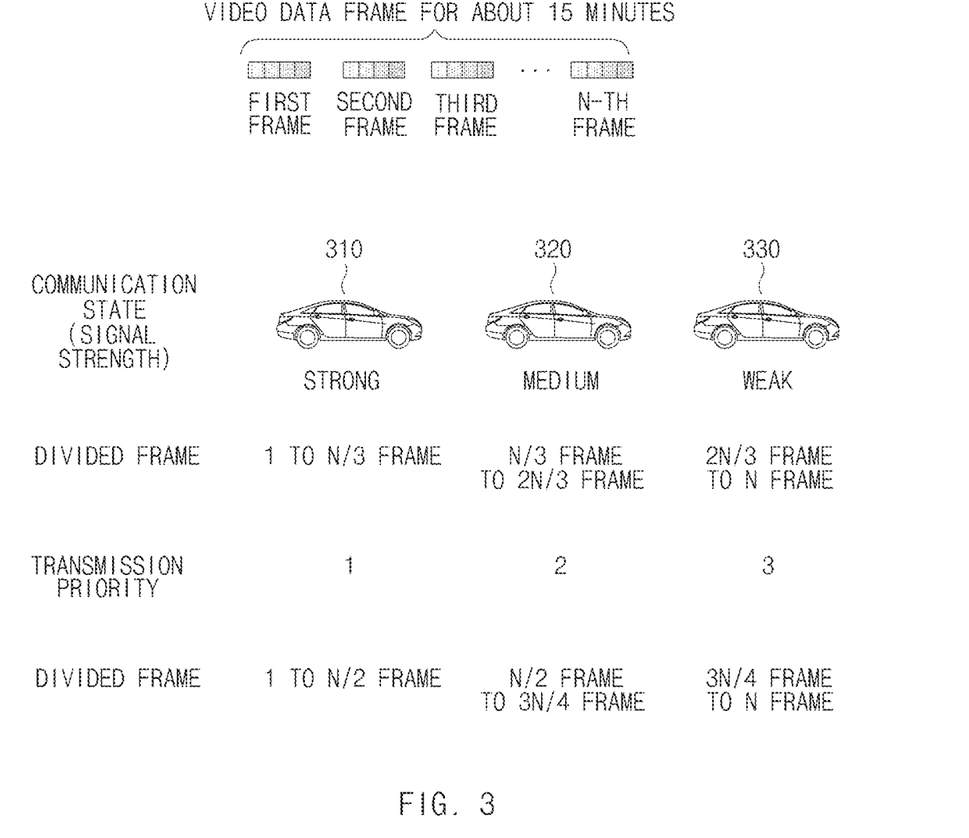
FIG. 3 is a view illustrating content division and transmission and reception of content to be divided according to an embodiment of the present disclosure.

FIG. 3 is a view illustrating content division and uploading and downloading of content to be divided according to an embodiment of the present disclosure.

In this embodiment, when frames of video content of about 15 minutes are required to be shared, the content sharing server 100 may retrieve the communication states of the plurality of content providing vehicles 300. In this embodiment, the communication states may include "Strong", "Medium", and "Weak". Other communication states may be used. As illustrated in FIG. 3, when the communication states of the first-third content providing vehicles 310-330 are evaluated sequentially in order of strength, the first content providing vehicle 310 having the signal strength of "Strong" may upload the content of 1 to N/3 frames to be reproduced first. The second content providing vehicle 320 having the signal strength of "Medium" may upload the content of N/3 to 2N/3 frames to be reproduced next. Finally, the remaining content of 2N/3 frames to N frames may be uploaded from the third content providing vehicle 330 having the weakest signal strength ("Weak").

Alternatively, depending on the signal strength, the amount of content to be uploaded may be different. However, the playback time of the content remains the same.

As shown, the largest amount of content frames (1 to N/2 frames) may be uploaded from the first content providing vehicle 310 having the signal strength of "Strong". The remaining content frames (N/2 frames to 3N/4 frames and 3N/4 frames to N frames) may be uploaded from the content providing vehicle 320 having the signal strength of "Middle" and the third content providing vehicle 330 having the weakest signal strength ("Weak"), respectively.

In summary, the content sharing server 100 according to the embodiment may identify a plurality of vehicles having the same content, divide the content data, and control simultaneous or sequential upload and download of the divided content data. In this case, based on the communication state, the content sharing server 100 may allow the vehicle having the highest signal strength to upload the part of the content data having the earliest reproduction time or to transmit the largest amount of content data.

When the content is shared, the content sharing server 100 may upload only an amount of specific content corresponding to the driving time of the content receiving vehicle 200 instead of all the specific content and may download it to the content receiving vehicle 200. Thus, the user may enjoy the content in the vehicle while driving, and it is possible to reduce communication waste caused by transmitting and receiving an excessive amount of content.

Figure 4:
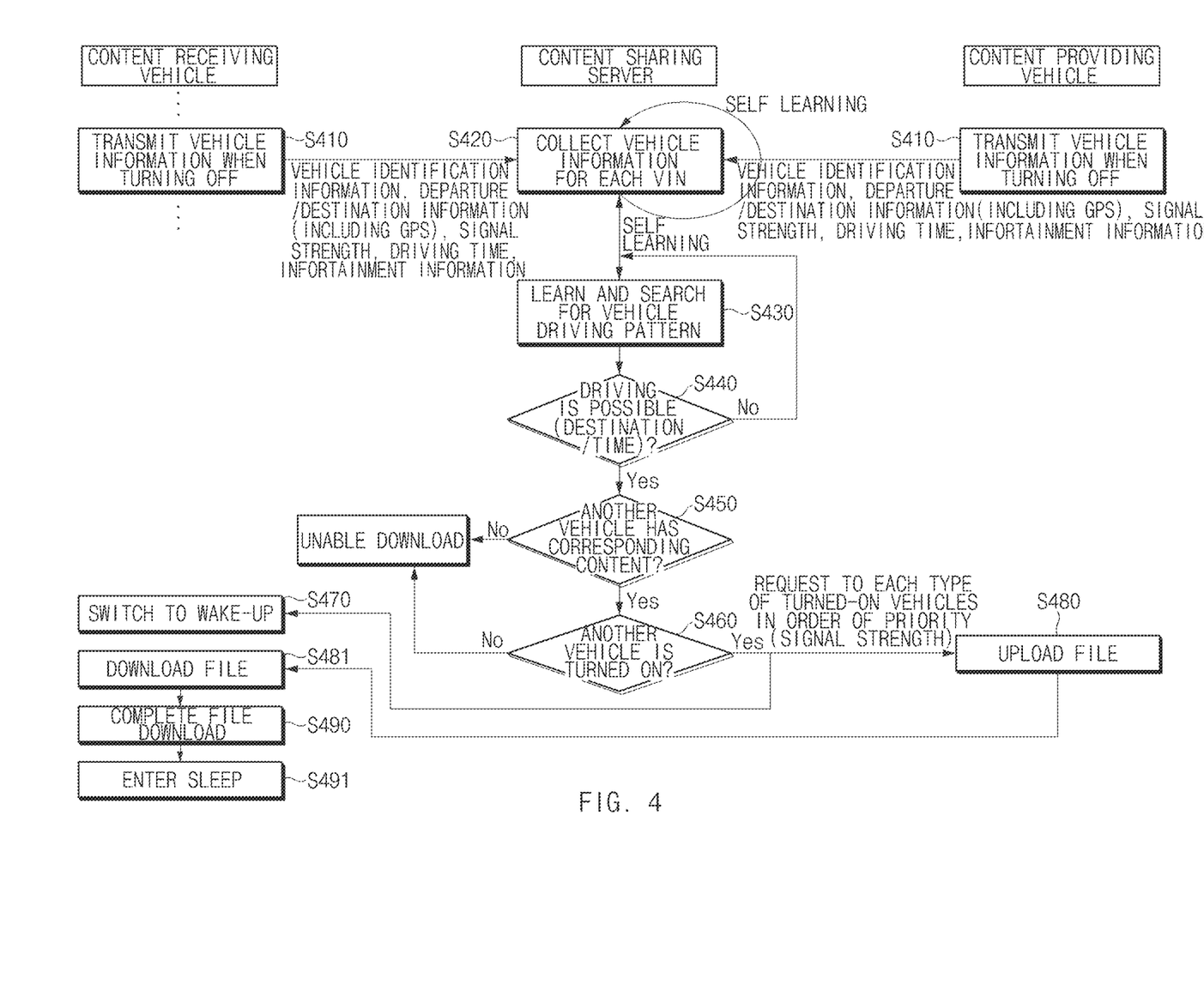
FIG. 4 is a flowchart illustrating a content sharing method according to an embodiment of the present disclosure.

Hereinafter, a content sharing method according to an embodiment of the present disclosure is described in detail with reference to FIG. 4. FIG. 4 is a flowchart illustrating a content sharing method according to an embodiment of the present disclosure.

Hereinafter, it is assumed that the content sharing server 100 and the integrated multimedia systems in the vehicles 200 and 300 of FIG. 2 perform the process of FIG. 4. In addition, in the description of FIG. 4, operations described as being performed by a device may be understood as being controlled by the content sharing server 100 and the integrated multi-media systems in the vehicles 200 and 300. The operation of the content sharing server 100 may be performed by the above-described content sharing controller that leads the content upload and download operation.

First, according to an embodiment, in operation S410, when the content providing vehicle 300 and the content receiving vehicle 200 are turned off, all the vehicles 200 and 300 transmit respective content sharing information to the content sharing server 100.

As shown, the content sharing information may include vehicle identification information, departure/destination information (including GPS), signal strength, driving time, infotainment information, and the like. As infotainment information, it may include content to be played, content playing time, content format information, and the like.

In operation S420, the content sharing server 100 collects and stores the received vehicle information for each vehicle, i.e., the received content sharing information. In operation S430, the content sharing server 100 learns a vehicle driving pattern and determines whether a driving pattern suitable for the content receiving vehicle 200 exists.

In other words, the content sharing server 100 learns the vehicle driving pattern based on the driving information including the starting and the destination content-sharing information collected when the vehicle is turned off. When the vehicle is turned on, the destination of the vehicle and the driving time to the destination may be retrieved based on the learned driving pattern. In this case, the learning may be performed through deep or machine learning using vehicle content sharing information, i.e., big data.

Based on this driving pattern learning, it is possible to determine whether or not the content receiving vehicle 200 can be operated in the future (S440). In other words, the content sharing server 100 may determine whether the content receiving vehicle 200 is traveling through a previously learned driving pattern at which the driving starts from a starting point and ends in a destination. Based on the driving pattern learning, it is possible to determine a driving time from the starting point to the destination.

When it is determined that the operation of the content receiving vehicle 200 is possible from the learning and search result data in operation S450, the content sharing server 100 may determine whether another vehicle has relevant content that may be reproduced in the content receiving vehicle 200.

For example, the content sharing server 100 may search for the content providing vehicle 300 storing the same content as the content played in the content receiving vehicle 200. Alternatively, the content sharing server 100 may search for the content providing vehicle 300 that stores content similar to or highly related to content played in the content receiving vehicle 200.

In addition, according to an embodiment, the content sharing server 100 may search for the content providing vehicles 300 that store content that may be reproduced during the driving time of the content receiving vehicle 200 rather than all of the specific content. In other words, only content to be reproduced during a driving time may be uploaded and downloaded.

In other words, when uploading content, the time required for the content receiving vehicle 200 to move to the destination may be calculated based on the driving information, the content size corresponding to the time may be determined, and the content may be divided corresponding to the content size based on the number of content providing vehicles 300.

In addition, according to an embodiment, except for the content portion reproduced in the content receiving vehicle 200, the remaining content may be uploaded from the content providing vehicle 300.

On the contrary, when it is determined that the operation of the content receiving vehicle 200 is not possible based on the learning and search result data, or when any learned driving patterns cannot be found, the content sharing server 100 may repeat the operations of collecting and learning content sharing information again.

When another vehicle type, in other words, when the content providing vehicle 300 has relevant content that may be shared with the content receiving vehicle 200, in operation S460, the content sharing server 100 may determine whether the content providing vehicle 300 storing the content is in the turn-on state.

When the content providing vehicle 300 is in the turn-on state, the content sharing server 100 may request the content data from each type vehicle in the turn-on state. The content sharing server 100 may request the upload of the content data based on the priority described with reference to FIG. 3. In this case, the content may be divided corresponding to the plurality of content providing vehicles 300 and then the upload of the content may be requested.

The content sharing server 100 may retrieve the communication states of the plurality of content providing vehicles 300. The content sharing server 100 may request the content providing vehicle 300 having the best communication state (e.g., fastest upload speed or highest signal strength) among the plurality of content providing vehicles 300 to upload the divided content in the first rank. The divided content uploaded in the first rank may correspond to a portion reproduced first in the content sharing server 100.

Alternatively, the content sharing server 100 may request the content providing vehicle having the best communication state among the plurality of content providing vehicles 300 to upload the largest amount of divided content.

In operation S470, the content sharing server 100 requests the content and switches the content receiving vehicle 200 to a wakeup state when the content receiving vehicle 200 is in the turn-off state.

The content providing vehicle 300, which is in the turn-on state, may upload the content file in response to the request of the content sharing server 100 in operation S480. In operation S481, the file is downloaded to the content receiving vehicle 200 which is turned off but is switched to the wake-up state by the content sharing server 100.

When the downloading of the content file is completed in operation S490, the content sharing server 100 switches the content receiving vehicle 200 into a sleep state in operation S491.

When the operation returns to operations S450 and S460, and another vehicle does not have relevant content that may be shared with the content receiving vehicle 200, or the content providing vehicle 300 that has the content is not in the turn-on state, the downloading of content, i.e., content sharing, is not performed.

In summary, for the purpose of the content sharing according to the embodiment, the collection and learning of content sharing information are performed by the content sharing server 100 in the turn-off state. The content receiving vehicle in the turn-off state can share content with the content providing vehicle in the turn-on state.

Thus, it is also possible to identify the intention of the vehicle to share or download the content. Therefore, the vehicle with the intention to download the content can secure the desired content before driving.

In addition, according to an embodiment of the present disclosure, a user interface (UI) that allows a user to select whether to upload or download content may be provided by the vehicle system. Users who do not want to share their content or are reluctant to leak personal information may refuse content sharing.

In addition, all shared content information and history may be stored in the content receiving vehicle 200, the content providing vehicle 300 and the content sharing server 100. Statistical data on content sharing may be provided to a vehicle. The content sharing history may be used to search for or recommend similar content.

Alternatively, according to another embodiment of the present disclosure, the content providing vehicle may also upload content in the turn-on state as well as in the turn-off state if there was prior consent. This is to prevent the use of data while driving, in other words, this prevents the vehicle from being affected by the communication state while being driven. This option may also be changed by the setting of the user.

Alternatively, according to still another embodiment, without relying on the learning of the content sharing server 100, the content receiving vehicle 200 may transmit a content wish list or the like to the content sharing server 100. The content sharing server 100 that receives the content wish list may control the sharing of content in the wish list.

Alternatively, according to another embodiment, when the content receiving vehicle 200 is in the wake-up state, the content stored in the content receiving vehicle 200 may also be shared with other vehicles. In this case, a presetting of content sharing in the wake-up state may be required by the user.

Figure 5:
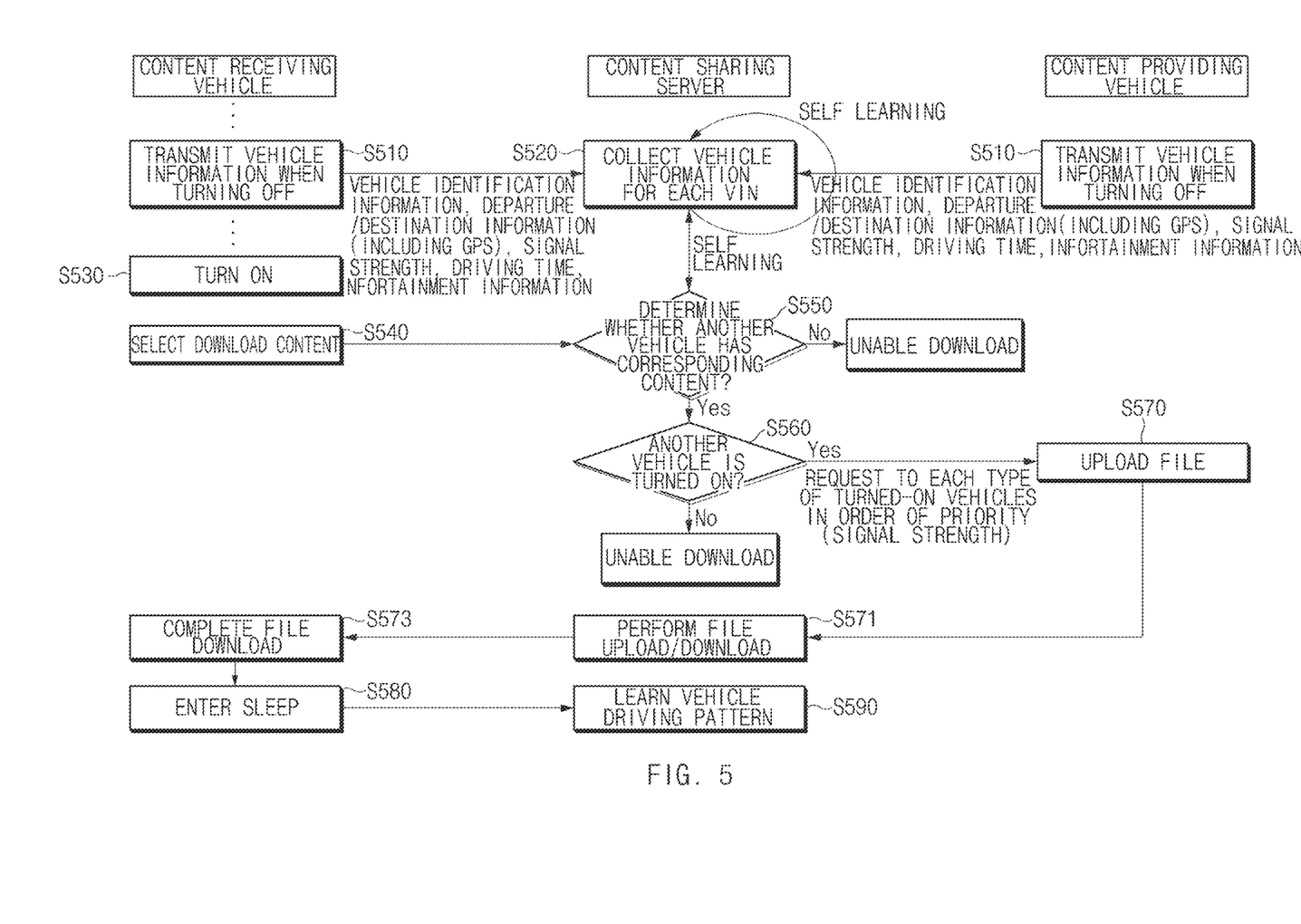
FIG. 5 is a flowchart illustrating a content sharing method according to another embodiment of the present disclosure.

FIG. 5 is a flowchart illustrating a content sharing method according to another embodiment of the present disclosure. Although FIG. 5 illustrates an initial content sharing method as an example, the embodiment is not limited to the content sharing timing and may be regarded as a content sharing method applicable to a different situation from FIG. 4.

First, in this embodiment, in operation S510, similar to the method shown in FIG. 4, the content providing vehicle 300 and the content receiving vehicle 200 transmit respective content sharing information to the content sharing server 100 when being turned off.

As shown, the content sharing information may include vehicle identification information, departure/destination information (including GPS), signal strength, driving time, infotainment information, and the like. The infotainment information may include content to be reproduced, content reproduction time, content format information, and the like.

In S520, the content sharing server 100 may collect and store vehicle information for each vehicle, i.e., the received content sharing information, and self-learn a vehicle driving pattern.

According to an embodiment, when the content receiving vehicle 200 is in the turn-on state in operation S530, the user of the content receiving vehicle 200 may select the content to be downloaded in operation S540. In other words, unlike the embodiment of FIG. 4, the vehicle user may receive content to be reproduced while the vehicle is driven.

In operation S550, the content sharing server 100 receiving the content sharing request may determine whether another vehicle has the content requested by the content receiving vehicle 200.

According to an embodiment, the content sharing server 100 may search for the plurality of content providing vehicles 300 that store content that can be reproduced during the driving time of the content receiving vehicle 200 rather than all of the specific content. In this case, the content receiving vehicle 200 may provide the content sharing server 100 with the reproduction time of the content to be downloaded or driving time, or destination information.

When another vehicle type, i.e., the content providing vehicle 300, has the content requested by the content receiving vehicle 200, in operation S560, the content sharing server 100 may determine whether the content providing vehicle 300 storing the content is in the turned-on state.

When the content providing vehicle 300 is in the turn-on state, the content sharing server 100 may request content for each vehicle type in the turn-on state and may request the content data upload based on the priority described with reference to FIG. 3. In this case, the content may be requested to be divided corresponding to the plurality of content providing vehicles 300.

In this case, the content sharing server 100 may retrieve the communication states of the plurality of content providing vehicles 300. The content sharing server 100 may request the content providing vehicle 300 having the best communication state among the plurality of content providing vehicles 300 to upload the divided content in the first rank, where the divided content uploaded in the first rank may correspond to a portion reproduced first in the content sharing server 100.

Alternatively, the content sharing server 100 may request the content providing vehicle 300 having the best communication state among the plurality of content providing vehicles 300 to upload of the largest amount of divided content.

The content providing vehicle 300, which is in the turn-on state, may upload the content file in response to the request of the content sharing server 100 in operation S570. The upload and download of the file may be performed and controlled by the content sharing server 100 in operation S571.

Accordingly, the download of the content file is completed in operation S573. When the driving is finished, the content receiving vehicle 200 may be turned off in operation S580.

In operation S590, when the content receiving vehicle 200 is turned off, the content sharing information may be transmitted to the content sharing server 100 again and the content sharing server 100 may learn the vehicle driving pattern.

Thereafter, the operations of FIG. 4 or 5 may be repeated for content sharing.

When the content sharing server 100 returns to operations S550 and S560 again, and another vehicle does not have relevant content that may be shared with the content receiving vehicle 200, or the content providing vehicle 300 having the content is not in the turn-on state, the download of the content, i.e., the content sharing, is not achieved.

As described above, according to the present disclosure, there are provided a content sharing system and a method thereof which may activate the content sharing between vehicles and may download desired content data without being greatly influenced by the turn-on state of a vehicle by providing a detailed method for sharing content between vehicles.

Figure 6:
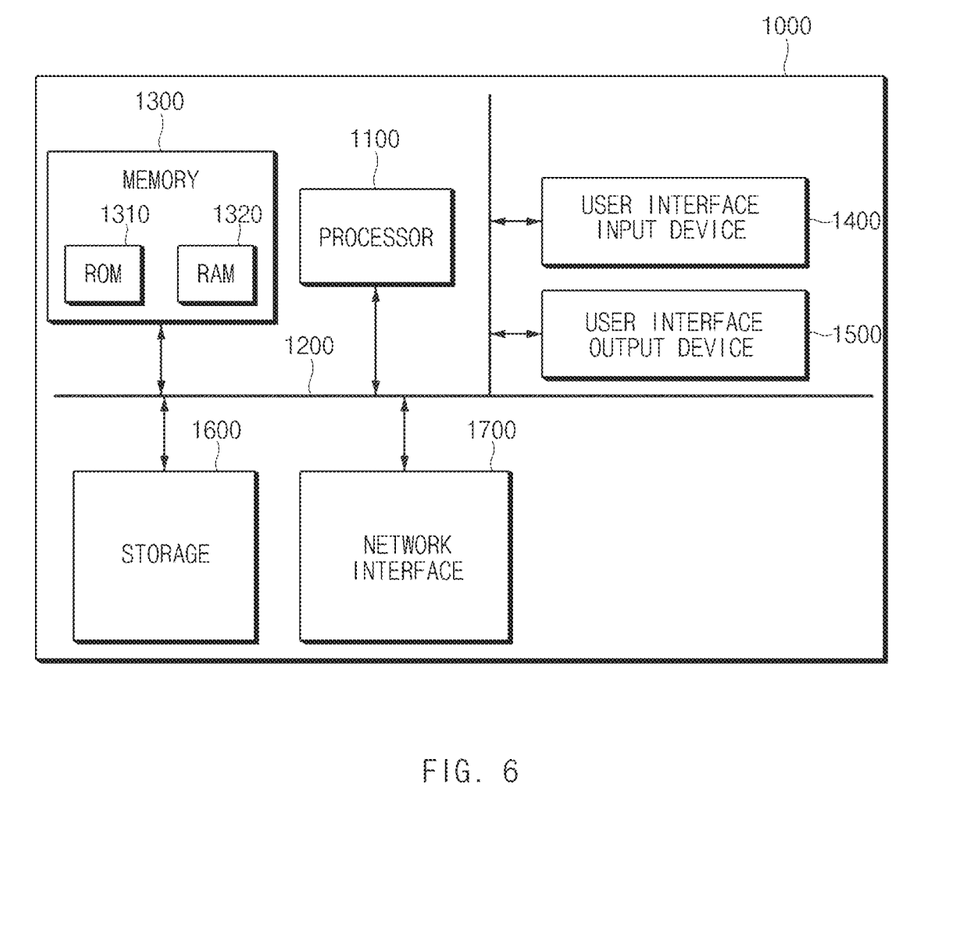
FIG. 6 is a block diagram illustrating a computing system according to an embodiment of the present disclosure.

FIG. 6 is a block diagram illustrating a computing system according to an embodiment of the present disclosure.

Referring to FIG. 6, a computing system 1000 may include at least one processor 1100, a non-transitory memory 1300, a user interface input device 1400, a user interface output device 1500, a storage 1600, and a network interface 1700 connected through a system bus 1200. The content sharing controller may be implemented by the processor 1100 coupled with the non-transitory memory 1300. The communication device may be implemented by the network interface 1700.

The processor 1100 may be a central processing unit (CPU), or a semiconductor device that processes computer-executable instructions stored in the memory 1300 and/or the storage 1600. The memory 1300 and the storage 1600 may include various types of volatile or non-volatile storage media. For example, the memory 1300 may include a read only memory (ROM) and a random access memory (RAM).

Accordingly, the processes of the method or algorithm described in relation to the embodiments of the present disclosure may be implemented directly by hardware executed by the processor 1100, a software module, or a combination thereof. The software module may reside in a non-transitory storage medium (i.e., the memory 1300 and/or the storage 1600), such as a RAM, a flash memory, a ROM, an EPROM, an EEPROM, a register, a hard disk, solid state drive (SSD), a detachable disk, or a CD-ROM.

The storage medium is coupled to the processor 1100. The processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

According to the embodiments of the present disclosure, there are provided a server for providing a vehicle content sharing service and a content sharing method that can easily obtain desired content through data sharing between vehicles.

According to the embodiments of the present disclosure, there are provided a server for providing a vehicle content sharing service and a content sharing method that can download content in advance by learning the driving pattern of a driver and use the content without inconvenience.

In addition, according to the embodiments of the present disclosure, there are provided a server for providing a vehicle content sharing service and a content sharing method that can download content in a state in which a vehicle is turned off.

In addition, various effects that are directly or indirectly understood through the present disclosure may be provided.

The above description is an example of the technical spirit of the present disclosure. The present disclosure may be variously implemented and modified by those of ordinary skill in the art to which the present disclosure pertains without departing from the essential features of the present disclosure.

Therefore, the disclosed embodiments of the present disclosure do not limit the technical spirit of the present disclosure but are illustrative. The scope of the technical spirit of the present disclosure is not limited by the embodiments of the present disclosure. The scope of the present disclosure should be construed by the claims. It should be understood that all the technical spirits within the equivalent range fall within the scope of the present disclosure.

What is claimed is:

1. A content sharing server for providing a vehicle content sharing service, the content sharing server comprising:
    a communication device configured to receive content sharing information including vehicle identification information, content information reproducible in a vehicle, and driving information from at least one content receiving vehicle; and
    a content sharing controller configured to store the content sharing information, search for a plurality of content providing vehicles that store content to be reproduced in the at least one content receiving vehicle, divide the content based on a number of the plurality of content providing vehicles, and download, to the at least one content receiving vehicle, the divided content uploaded from the plurality of content providing vehicles in order of a preset priority.

2. The content sharing server of claim 1, wherein the content sharing controller is configured to calculate a time required for the at least one content receiving vehicle to move to a destination based on the driving information, determine a content size corresponding to the time, and divide the content corresponding to the content size based on the number of the plurality of content providing vehicles.

3. The content sharing server of claim 2, wherein the content sharing controller is configured to understand communication states of the plurality of content providing vehicles, and request a content providing vehicle having a highest signal strength among the plurality of content providing vehicles to upload the divided content in a first rank, and
    wherein the divided content uploaded in the first rank is reproduced first.

4. The content sharing server of claim 2, wherein the content sharing controller is configured to understand communication states of the plurality of content providing vehicles, and request a content providing vehicle having a highest signal strength among the plurality of content providing vehicles to upload a largest amount of divided content.

5. The content sharing server of claim 1, wherein the driving information includes departure and destination information of the at least one content receiving vehicle,
    wherein the content sharing information further includes signal strength for data communication, a content reproduction time, and content format information, and
    wherein the content sharing information is transmitted when the vehicle is turned off.

6. The content sharing server of claim 5, wherein the content sharing controller is configured to learn a vehicle driving pattern based on the driving information, understand a destination of the vehicle and a driving time to the destination based on the learned driving pattern when the vehicle is turned on, and search for a content providing vehicle that stores a same content as the content reproduced in the at least one content receiving vehicle.

7. The content sharing server of claim 6, wherein the content sharing controller is configured to receive a remaining portion of the content that has not been reproduced in the at least one content receiving vehicle, from the content providing vehicle.

8. The content sharing server of claim 6, wherein the content sharing controller is configured to receive the same content from a content providing vehicle which is turned on among the content providing vehicles storing the same content.

9. The content sharing server of claim 8, wherein the content sharing controller is configured to download the content after switching to a wakeup state when the at least one content receiving vehicle is turned off, and switch the at least one content receiving vehicle to a sleep state after downloading the content.

10. The content sharing server of claim 8, wherein the content stored in the at least one content receiving vehicle is uploaded to another vehicle when the at least one content receiving vehicle is in a wakeup state.

11. A content sharing method for providing a vehicle content sharing service, the content sharing method comprising:
receiving content sharing information including vehicle identification information, content information reproducible in a vehicle, and driving information from at least one content receiving vehicle;
storing and learning the received content sharing information;
searching for a plurality of content providing vehicles that store content to be reproduced in the at least one content receiving vehicle;
dividing the content based on a number of the plurality of content providing vehicles, and uploading the divided content from the plurality of content providing vehicles in order of a preset priority; and
downloading the divided content to the at least one content receiving vehicle.

12. The content sharing method of claim 11, wherein the uploading of the divided content includes:
calculating a time required for the at least one content receiving vehicle to move to a destination based on the driving information; and
determining a content size corresponding to the time and dividing the content corresponding to the content size based on the number of the plurality of content providing vehicles.

13. The content sharing method of claim 12, further comprising:
understanding communication states of the plurality of content providing vehicles,
wherein the uploading of the content includes:
requesting a content providing vehicle having a highest signal strength among the plurality of content providing vehicles to upload the divided content in a first rank, and
first reproducing the divided content uploaded in the first rank.

14. The content sharing method of claim 12, further comprising:
understanding communication states of the plurality of content providing vehicles,
wherein the uploading of the content includes requesting a content providing vehicle having a highest signal strength among the plurality of content providing vehicles to upload a largest amount of divided content.

15. The content sharing method of claim 11, wherein the driving information includes departure and destination information of the at least one content receiving vehicle,
wherein the content sharing information further includes signal strength for data communication, a content reproduction time, and content format information, and
wherein the content sharing information is transmitted when the vehicle is turned off.

16. The content sharing method of claim 15, wherein the storing and learning of the content sharing information includes learning a vehicle driving pattern based on the driving information, and understanding a destination of the vehicle and a driving time to the destination based on the learned driving pattern when the vehicle is turned on, and
wherein the searching of the plurality of content providing vehicles includes searching for a content providing vehicle that stores a same content as the content reproduced in the at least one content receiving vehicle.

17. The content sharing method of claim 16, wherein the uploading of the content includes receiving a remaining portion of the content that has not be reproduced in the at least one content receiving vehicle, from the content providing vehicle.

18. The content sharing method of claim 16, wherein the uploading of the content includes receiving the same content from a content providing vehicle which is turned on among the content providing vehicles storing the same content.

19. The content sharing method of claim 18, wherein the downloading of the divided content includes:
downloading the content after switching to a wakeup state when the at least one content receiving vehicle is turned off, and
switching the at least one content receiving vehicle to a sleep state after downloading the content.

20. The content sharing method of claim 18, wherein the content stored in the at least one content receiving vehicle is uploaded to another vehicle when the at least one content receiving vehicle is in a wakeup state.

* * * * *